United States Patent
Habiger et al.

(10) Patent No.: US 9,871,905 B1
(45) Date of Patent: Jan. 16, 2018

(54) SYSTEMS AND METHODS FOR CUSTOMIZED DELIVERY OF VIRTUALLY INSTALLED APPLICATIONS

(71) Applicant: Sprint Communications Company L.P., Overland Park, KS (US)

(72) Inventors: Matthew Habiger, Kansas City, KS (US); Jared Harpole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/232,569

(22) Filed: Aug. 9, 2016

(51) Int. Cl.
| | |
|---|---|
| G06F 9/445 | (2006.01) |
| G06F 15/16 | (2006.01) |
| H04W 4/00 | (2009.01) |
| H04L 29/06 | (2006.01) |
| H04M 1/725 | (2006.01) |
| H04L 29/08 | (2006.01) |

(52) U.S. Cl.
CPC ...... *H04M 1/72525* (2013.01); *H04L 67/025* (2013.01); *H04L 67/22* (2013.01); *H04M 1/72561* (2013.01); *H04W 4/001* (2013.01); *H04W 4/003* (2013.01)

(58) Field of Classification Search
CPC .... H04M 1/72525; H04L 67/34; H04L 63/20; H04L 63/303; G06Q 30/0603; G06F 2201/865; G06F 8/61; G06F 8/65; G06F 8/60
See application file for complete search history.

(56) References Cited

U.S. PATENT DOCUMENTS

| | | |
|---|---|---|
| 5,600,776 A | 2/1997 | Johnson et al. |
| 5,806,071 A | 9/1998 | Balderrama et al. |
| 6,441,831 B1 | 8/2002 | Abramowitz et al. |
| 6,882,290 B2 | 4/2005 | French et al. |
| 7,409,208 B1 | 8/2008 | Clare et al. |
| 7,530,079 B2 | 5/2009 | Stubbs et al. |
| 7,552,432 B2 | 6/2009 | Aiba |
| 7,681,134 B1 | 3/2010 | Grechishkin et al. |
| 7,788,593 B1 | 8/2010 | Grechishkin et al. |
| 7,895,579 B2 * | 2/2011 | Guerrera ............. G06F 11/3419 717/125 |

(Continued)

OTHER PUBLICATIONS

T. Ki, API Virtualization for Platform Openness in Android, Jun. 2016, 2 pages.*

(Continued)

*Primary Examiner* — Thuy Dao

(57) ABSTRACT

A method of providing customized delivery of applications to a user equipment (UE) is disclosed. The method comprises installing a plurality of stub application on the UE, presenting the stub applications on the user interface as if each stub application is a full application, and monitoring requests for full applications and time of subsequent installation of full applications initiated by user input. In response to passage of a predefined time period, the method further includes storing a list of recommended full applications, generating an application programming interface call sequence, initiating at least one application programming interface call from the call sequence, receiving the new stub application in response, and supplanting one of the plurality of stub application with the new stub application.

20 Claims, 8 Drawing Sheets

(56) References Cited

U.S. PATENT DOCUMENTS

| | | | |
|---|---|---|---|
| 8,136,100 B1* | 3/2012 | Goldman | G06F 8/61 717/120 |
| 8,185,097 B2 | 5/2012 | Vanderlinden et al. | |
| 8,468,164 B1 | 6/2013 | Paleja et al. | |
| 8,522,343 B2 | 8/2013 | Hernacki | |
| 8,577,737 B1 | 11/2013 | Amacker et al. | |
| 8,650,096 B2 | 2/2014 | Van Buskirk et al. | |
| 8,855,012 B1 | 10/2014 | Suri | |
| 8,930,940 B2* | 1/2015 | Xu | G06F 8/61 717/175 |
| 9,092,291 B1 | 7/2015 | Adib et al. | |
| 9,098,366 B1 | 8/2015 | Adib et al. | |
| 9,124,719 B2 | 9/2015 | Inlow et al. | |
| 9,304,668 B2 | 4/2016 | Rezende et al. | |
| 9,319,270 B2 | 4/2016 | Bestmann et al. | |
| 9,338,158 B2* | 5/2016 | Storm | H04L 63/0807 |
| 9,357,378 B1 | 5/2016 | Delker et al. | |
| 9,398,462 B1 | 7/2016 | Delker et al. | |
| 9,483,253 B1 | 11/2016 | Schwermann et al. | |
| 9,513,888 B1 | 12/2016 | Fultz et al. | |
| 9,594,471 B1 | 3/2017 | Callan et al. | |
| 9,794,727 B1 | 10/2017 | Delker et al. | |
| 2004/0148598 A1 | 7/2004 | Kita et al. | |
| 2004/0237082 A1* | 11/2004 | Alcazar | G06F 8/61 717/174 |
| 2004/0254975 A1 | 12/2004 | Teh et al. | |
| 2005/0060665 A1 | 3/2005 | Rekimoto | |
| 2006/0168340 A1 | 7/2006 | Heller et al. | |
| 2006/0235760 A1 | 10/2006 | Sanjar et al. | |
| 2006/0235944 A1 | 10/2006 | Haslam | |
| 2007/0015538 A1 | 1/2007 | Wang | |
| 2007/0130156 A1 | 6/2007 | U. Tenhunen et al. | |
| 2007/0143740 A1 | 6/2007 | Hoerentrup et al. | |
| 2008/0046583 A1 | 2/2008 | Rao | |
| 2008/0051076 A1 | 2/2008 | OShaughnessy et al. | |
| 2008/0155275 A1 | 6/2008 | Natarajan et al. | |
| 2008/0160970 A1 | 7/2008 | Srinivas Reddy et al. | |
| 2008/0276182 A1 | 11/2008 | Leow | |
| 2009/0064055 A1 | 3/2009 | Chaudhri et al. | |
| 2009/0158407 A1* | 6/2009 | Nicodemus | H04L 69/32 726/6 |
| 2009/0199176 A1 | 8/2009 | Nath et al. | |
| 2009/0259974 A1 | 10/2009 | Lin | |
| 2009/0288079 A1 | 11/2009 | Zuber et al. | |
| 2010/0250368 A1 | 9/2010 | Porco | |
| 2010/0269107 A1 | 10/2010 | Jung et al. | |
| 2010/0306702 A1 | 12/2010 | Warner | |
| 2010/0311391 A1 | 12/2010 | Siu et al. | |
| 2010/0311468 A1 | 12/2010 | Shi et al. | |
| 2010/0321323 A1 | 12/2010 | Kim | |
| 2011/0034160 A1 | 2/2011 | Corda et al. | |
| 2011/0086611 A1 | 4/2011 | Klein et al. | |
| 2011/0208865 A1 | 8/2011 | Knowles et al. | |
| 2012/0015624 A1 | 1/2012 | Scott et al. | |
| 2012/0030512 A1 | 2/2012 | Wadhwa et al. | |
| 2012/0054022 A1 | 3/2012 | Kosashvili | |
| 2012/0072311 A1 | 3/2012 | Khan | |
| 2012/0272178 A1 | 10/2012 | Oygard et al. | |
| 2013/0013671 A1 | 1/2013 | Relan et al. | |
| 2013/0031541 A1 | 1/2013 | Wilks et al. | |
| 2013/0080911 A1 | 3/2013 | Klemm | |
| 2013/0275560 A1 | 10/2013 | Bestmann et al. | |
| 2013/0326359 A1 | 12/2013 | Beckert et al. | |
| 2013/0339833 A1 | 12/2013 | Chen et al. | |
| 2014/0068779 A1 | 3/2014 | Tan et al. | |
| 2014/0122563 A1 | 5/2014 | Singh et al. | |
| 2014/0298320 A1 | 10/2014 | Xu et al. | |
| 2015/0011311 A1 | 1/2015 | Relan et al. | |
| 2015/0040246 A1 | 2/2015 | Yuen et al. | |
| 2015/0220245 A1 | 8/2015 | Wojcik et al. | |
| 2015/0304506 A1 | 10/2015 | Zhu et al. | |
| 2015/0319178 A1 | 11/2015 | Desai et al. | |
| 2015/0331590 A1 | 11/2015 | Yasui | |
| 2015/0363958 A1 | 12/2015 | Zhu et al. | |
| 2015/0370428 A1 | 12/2015 | Chan et al. | |
| 2016/0044091 A1 | 2/2016 | Doumet | |
| 2016/0239317 A1 | 8/2016 | Cuddihy et al. | |

OTHER PUBLICATIONS

Bianchini et al., Semantics-enabled web APIs selection patterns, Sep. 2011, 5 pages.*

FAIPP Pre-Interview Communication dated Aug. 12, 2016, U.S. Appl. No. 14/169,544, filed Jan. 31, 2014.

Notice of Allowance dated Nov. 4, 2016, U.S. Appl. No. 14/169,544, filed Jan. 31, 2014.

FAIPP Pre-Interview Communication dated Apr. 10, 2017, U.S. Appl. No. 15/164,530, filed May 25, 2016.

Notice of Allowance dated Jun. 14, 2017, U.S. Appl. No. 15/164,530, filed May 25, 2016.

FAIPP Pre-Interview Communication dated Aug. 25, 2014, U.S. Appl. No. 13/940,251, filed Jul. 11, 2013.

First Action Interview Office Action dated Oct. 17, 2014, U.S. Appl. No. 13/940,251, filed Jul. 11, 2013.

Notice of Allowance dated Mar. 9, 2015, U.S. Appl. No. 13/940,251, filed Jul. 11, 2013.

FAIPP Pre-Interview Communication dated Aug. 25, 2014, U.S. Appl. No. 13/940,253, filed Jul. 11, 2013.

First Action Interview Office Action dated Oct. 17, 2014, U.S. Appl. No. 13/940,253, filed Jul. 11, 2013.

Notice of Allowance dated Mar. 6, 2015, U.S. Appl. No. 13/940,253, filed Jul. 11, 2013.

FAIPP Pre-Interview Communication dated Jul. 24, 2015, U.S. Appl. No. 14/168,007, filed Jan. 30, 2014.

Final Office Action dated Jan. 28, 2016, U.S. Appl. No. 14/168,007, filed Jan. 30, 2014.

Advisory Action dated Mar. 29, 2016, U.S. Appl. No. 14/168,007, filed Jan. 30, 2014.

Office Action dated Apr. 14, 2016, U.S. Appl. No. 14/168,007, filed Jan. 30, 2014.

Notice of Allowance dated Aug. 3, 2016, U.S. Appl. No. 14/168,007, filed Jan. 30, 2014.

Office Action dated Oct. 1, 2015, U.S. Appl. No. 14/701,156, filed Apr. 30, 2015.

Final Office Action dated Feb. 8, 2016, U.S. Appl. No. 14/701,156, filed Apr. 30, 2015.

Advisory Action dated Apr. 15, 2016, U.S. Appl. No. 14/701,156, filed Apr. 30, 2015.

Notice of Allowance dated Jun. 20, 2016, U.S. Appl. No. 14/701,156, filed Apr. 30, 2015.

Notice of Allowance dated Feb. 3, 2016, U.S. Appl. No. 14/639,056, filed Mar. 4, 2015.

Notice of Allowance dated Mar. 11, 2016, U.S. Appl. No. 14/639,060, filed Mar. 4, 2015.

Mehrotra, et al., "SenSocial: a Middleware for Integrating Online Social Networks and Mobile Sensing Data Streams," ACM, Middleware '14, Dec. 8-12, 2014, Bordeaux, France.

Fultz, David K., et al., "Virtual Preloads," filed Jan. 30, 2014, U.S. Appl. No. 14/168,007.

Callan, Jeffrey S., et al., entitled "System and Method for Inserting Additional Icon Content Into a Display Screen," 2014, filed on Jan. 31, 2014, U.S. Appl. No. 14/169,544.

Schwermann, Nathan M., et al., entitled, "Methods for Customization of Default Applications on a Mobile Communication Device," filed Apr. 30, 2015, U.S. Appl. No. 14/701,156.

Delker, Jason R., et al. "Network Access Tiered Based on Application Launcher Installation," filed May 25, 2016, U.S. Appl. No. 15/164,530.

* cited by examiner

SYSTEMS AND METHODS FOR CUSTOMIZED DELIVERY OF VIRTUALLY INSTALLED APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices—such as smart phones and wearable devices—may be capable of running a plurality of software applications. A mobile communication device may be referred to in some contexts as a user equipment (UE). Software applications include social media applications, weather applications, sports applications, gaming applications, map applications, and a wide variety of other non-native applications that execute on a UE. Executing software applications may provide a user of the mobile communication device with functionality that would be otherwise unavailable or inconvenient on the mobile communication device. For example, the user may find it convenient to use a software application to directly access a social media site rather than accessing the social media site manually by searching the Internet via browser. In some cases, software applications may be installed at the time of manufacture or by the user of the UE. Software applications may take up memory space on the UE irrespective of the frequency with which they are used. Moreover, the complexity of software applications and updates may cause the memory size of individual applications to increase, despite possible decrease in the frequency of use by the user of the UE.

SUMMARY

In an embodiment, a method of providing customized delivery of applications to a user equipment (UE) is disclosed. The method comprises installing, via execution of a client on a processor of the UE from storage in non-transitory memory, a plurality of stub applications on the UE. The method also includes presenting, by the client via a display of the UE, the plurality of stub applications on the user interface as if each stub application is a full application, and monitoring, by the client via a communication bus, requests for full applications and time of subsequent installation of full applications initiated by user input via the user interface. In response to passage of a predefined time period since the monitoring initiates for the first time on the UE, the method continues by storing, in the non-transitory memory, a list of recommended full applications that is assembled based on the monitoring, and generating, by the client, an application programming interface (API) call sequence that designates a ranked order with which to call a subset of the recommended full applications from the list. The method also comprises initiating, by the client, at least one API call from the API call sequence, where the API call requests a new stub application corresponding to a recommended full application from the list. The method continues with receiving the new stub application in response to the at least one API call, and supplanting, by the client, one of the plurality of stub applications with the new stub application, where the new stub application is virtually represented on the display as the recommended full application without having all functionality of the recommended full application.

In an embodiment, a system for providing customized delivery of applications to a user equipment (UE) is disclosed. The system comprises a UE which includes a display comprising a user interface, a non-transitory memory storing a plurality of stub applications, a processor, and a client application stored in the non-transitory memory that, upon execution by the processor, configures at least the processor to present, via the display, the plurality of stub applications on the user interface as if each stub application is a full application. The UE is also configured to monitor requests for full applications and time of subsequent installation of full applications initiated by user input via the user interface. In response to passage of a predefined time period since the monitoring initiates for the first time on the UE, the UE is configured to store a list of recommended full applications that is assembled based on the monitoring, and generate an application programming interface (API) call sequence that designates a ranked order with which to call a subset of the recommended full applications from the list. The UE is also configured to initiate at least one API call from the API call sequence, where the API call requests a new stub application corresponding to a recommended full application from the list according to the ranked order. The UE is configured to receive the new stub application in response to the at least one API call, and supplant one of the plurality of stub applications with the new stub application, where the new stub application is virtually represented on the display as the recommended full application without having all functionality of the recommended full application.

In an embodiment, another method of providing customized delivery of applications to a user equipment (UE) is disclosed. The method comprises installing, via execution of a client on a processor of the UE from storage in non-transitory memory, a plurality of stub applications in non-transitory memory on the UE, where the plurality of stub applications are virtually represented on a user interface as if each stub application is a full application. The method continues with monitoring, by the client via a communication bus, requests for full applications and time of subsequent installation of full applications initiated by user input via the user interface. In response to passage of a predefined time period since the monitoring initiates for the first time on the UE, the method further comprises receiving and storing, by the client, a list of recommended full applications that is assembled based on the monitoring, and detecting, by the client via the user interface, a delete request corresponding to a full application that is being virtually represented on the user interface by one of the plurality of stub applications. In response to detecting, the method also include ceasing, by the client, the virtual representation of the full application by removing the corresponding stub application from the user interface, and initiating, by the client, at least one application programming interface (API) call that requests a new stub application associated with a recommended full application from the list. The method further comprises receiving, by the client, the new stub application in response to the at least one API call, and supplanting, by the client on the user interface, the stub application corresponding to the delete request with the new stub application, where the new stub application virtually represents the recommended full application on the user interface without having all functionality of the recommended full application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
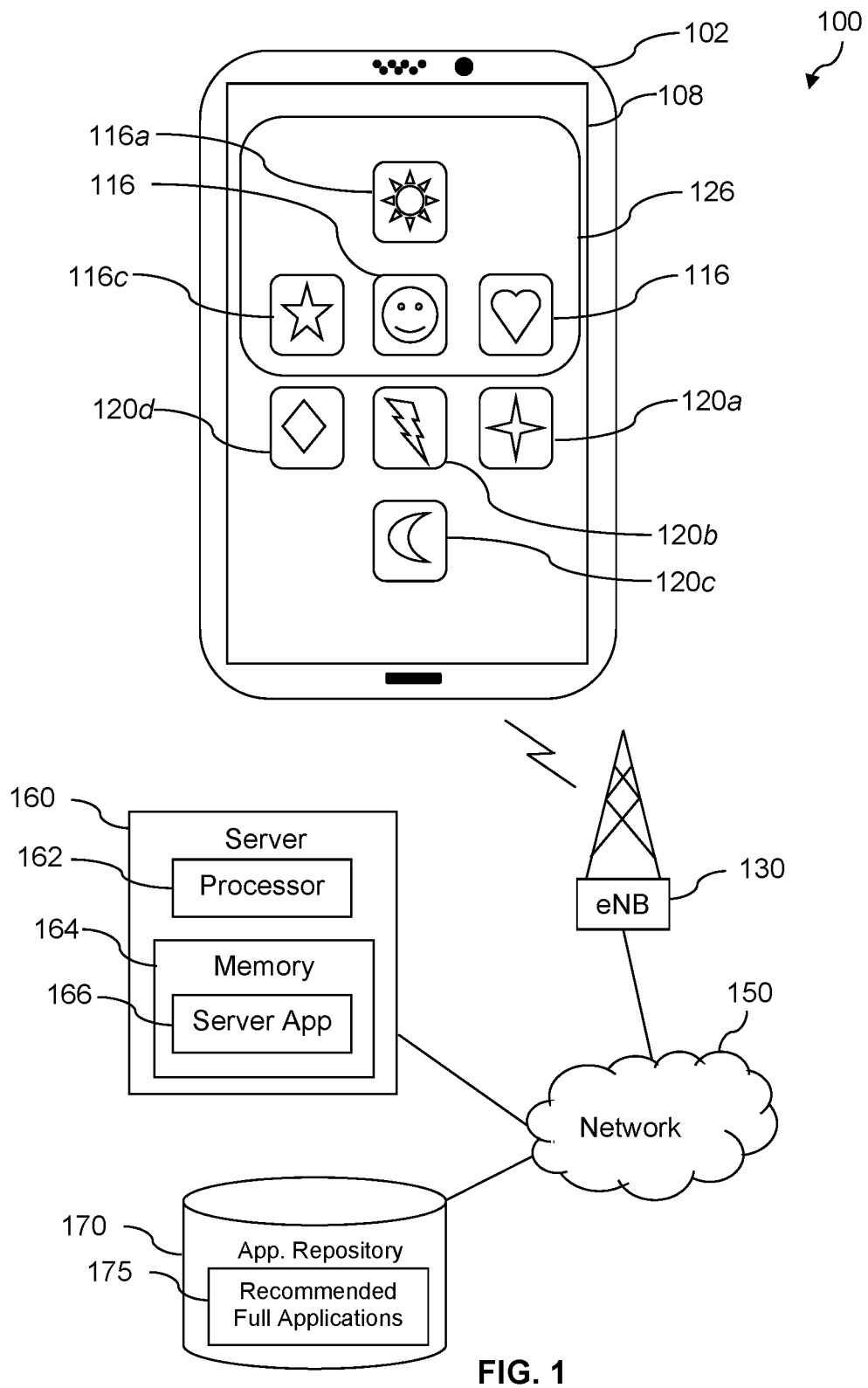
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a user purchases and subsequently activates their user equipment, such as a mobile phone, the user may be presented with a default interface configuration or default installation of applications and other interface components. The user's initial interactions with the mobile communication device may be shaped by a number of interface components, including but not limited to: wallpaper, ringtones, audible prompts, audible indications, audible tones, widgets, interface controls, and applications present on the mobile communication device. A user's interactions with and impressions of a mobile communication device may engage aspects of the appearance and operations of interfaces presented on the device, applications supported by the device, convenience features available through the device, and the amount of memory being used by applications installed on the device once activation occurs. A user may endeavor to personalize the installation by moving or deleting default applications, downloading their preferred applications, changing wallpaper, and/or by conducting other personalization activities.

Businesses, such as service providers and application providers, sometimes enter into financial agreements concerning inclusion and placement of features, such as applications, in the default installation provided to the user equipment. In some embodiments, a default installation may comprise a plurality of full applications and one or more stub applications, which are discussed in detail below. Providing a default installation with full applications that the user is interested in may increase the likelihood that a user is happy with the default installation, which in turn may decrease the risk of applications included in the default installation being deleted. The user's satisfaction may increase when full applications, which are relevant and interesting to the user, are available on their UE without manual installation by the user. Providing a default installation for the user creates technical challenges because the inclusion of multiple full applications in a package for installation on a mobile device may consume a proportionately large amount of memory space relative to the total available memory on the device. For example, a mobile device with an advertised thirty-two gigabytes of memory storage may actually only have sixteen gigabytes available upon activation, where four gigabytes are consumed by full applications through the default installation. As full applications grow in complexity—such as mobile games, social media applications, web browsers, photography and camera applications, retail shopping applications, and other applications available from an online mobile marketplace—so does the size of their overall memory footprint and requirements for processing resources on the UE. Additionally, another layer of technical complexity is added when the wireless service provider does not have access to a user account profile containing preferences and activity history from which the server may draw recommendations for the user's device. As such, reducing the memory footprint of installation on the mobile device, while also increasing the speed with which the relevancy of full applications is determined and delivered to the user equipment may improve the satisfaction of the user.

Some embodiments of the present disclosure teach dynamically determining and customizing delivery of recommended applications for a user equipment through the use of a client application on the UE and virtually installed applications, referred to herein as stub applications. As further discussed below, stub applications provide a mechanism for recommended full applications to be virtually installed on the UE without taking up the memory space of the entire full application (or trial version of the full application), and once launched by a user selection input, the stub application installs the recommended full application without further user input, such as by satisfying installation requirements through presentation of installation certificates or other installation permissions. In an embodiment, a client application executes on the UE and implements recommendations for full applications using stub application over the course of multiple time phases, such as three time phases. For example, initially the client application may install a non-customized set of recommended applications (e.g., popular applications, applications selected by the wireless service provider, etc.) as virtually installed applications on the UE. In other words, a set of stub applications is installed on the UE, and each stub application presents itself on the user interface as if it was a recommended full application, but does not consume as large of a memory footprint relative to the recommended full application actually being installed.

The client application may monitor what full applications a user is installing overall on the device once the UE is activated with the network, and monitor the order in which those full applications are installed, while also monitoring whether any of the stub applications have been selected or deleted by the user. In some implementations, this may be accomplished without the client application making direct contact with each full application and instead by monitoring a communication bus and network requests. Local monitoring of the communication bus by the client application without making direct contact with full applications may maintain the integrity of content in the packets traveling to the wireless network via a transceiver, and preserve privacy controls implemented by an operating system of the UE. The use of the local client application on the UE to manage stub applications may improve the operation of a UE by increasing the available memory footprint on each UE through the use of stub applications, while also improving the wireless network by decreasing the frequency with which undesired full applications are routed to the mobile devices, thereby improving network efficiency.

In an embodiment, after one to twenty-four hours passes and based on the monitored information, a server application receives the monitored information and develops a ranked list of application recommendations, which are then sent back to the client application on the UE. For example, the monitored information sent by the client application may include which full applications were installed on the UE by the user (i.e., full applications independent from the stub applications) and which stub applications were shown on the UE but not selected by the user and thus the corresponding recommended full application was not installed. In response to sending the monitored information, the client application may receive a list of fifty recommended applications, and from that list, generates the eight highest ranked applications recommendations into a sequence for implementation via stub applications. The client application may request eight new stub applications—intermittently or all at once—with each stub application comprising information that corresponds to the eight highest ranked applications recommended from the list. The client application may then install and propagate each of the eight highest recommended applications to the user interface via stub applications, and supplant the previous recommended applications that were presented as part of the non-customized set. The client application may then continue monitoring information after the new stub applications are received. This monitoring by the client application may determine whether any new stub applications are selected and whether any of the full applications on the UE have been updated or new full applications installed on the UE without the use of stub applications. This local monitoring by the client application may continue to preserve the privacy settings on the UE by not making direct contact with the full applications and not alter the content sent or received by the full applications.

In an embodiment, after five days have passed (or any other defined time period), the client application may send additional monitored information to the server for development of a new list of recommended applications. For example, the client application may note what applications were installed initially at start-up and activation of the UE. The client may also identify which full applications have been updated and the timing with which they were updated. The client application and/or server may use this information to determine when the updates became available from the application provider, and thereby develop more refined recommendations for the user. For instance, a fully installed application which is updated by the user thirty minutes after the update becomes available may be more likely favored by the user than an installed full application which is months behind in available updates. The server may also identify and exclude recommendations for full applications which are already installed on the UE and full applications in a category that is already well represented on the UE. For instance, if three banking applications are already installed on the UE and the typical user installs only two banking applications, then the server may exclude another banking application from being recommended to the user for inclusion via stub applications. Once a new list of recommended applications is developed, it may be sent to the client, which installs these recommendations through new stub applications as virtually installed full applications on the UE, thereby supplanting the virtually installed full applications previously being presented through prior stub applications. This may allow for an improved functioning of the user equipment through more available computing resources, while also providing a customized delivery of applications to the device.

The preceding paragraphs are not intended to be limiting, but are illustrative of example benefits of the system and methods described by this disclosure according to some implementations. The system will now be described in more detail according to some implementations.

Turning now to FIG. 1, an illustration of an example configuration of system 100 is provided. In an embodiment, the system architecture 100 comprises a UE 102, network equipment 130 (e.g., an eNodeB, base transceiver station, cell tower, edge node, etc.), a network 150 (e.g., a carrier-based network using LTE, 4G, 3G, a cloud network, etc.), a network server 160, and an application repository 170 (e.g., a data store comprising non-transitory memory), where the application repository 170 comprises recommended full applications 175. Within system 100, communication links between the network server 160 and UE 102 may be established wirelessly via network equipment 130 and/or via wired links via network 150. Although the illustrated embodiment of system 100 comprises a single UE 102, a single network equipment 130, a single network 150, a single server 160, and a single data store 170, it is understood that, in some embodiments, the system 100 may comprise a plurality of UEs 102, a plurality of network equipment 130 in varied form factors, a plurality of networks 150, a plurality of servers 160, a plurality of data stores 170, or any combinations thereof that operate and execute concurrently and/or consecutively.

The UE 102 may include a variety of form factors, such as a mobile phone (including smart phones), tablet computer, wearable computer, digital media player, electronic book readers, a personal computer having an integrated or external wireless network communication device, game platforms, or other devices configured with wired and/or wireless communication.

Figure 2:
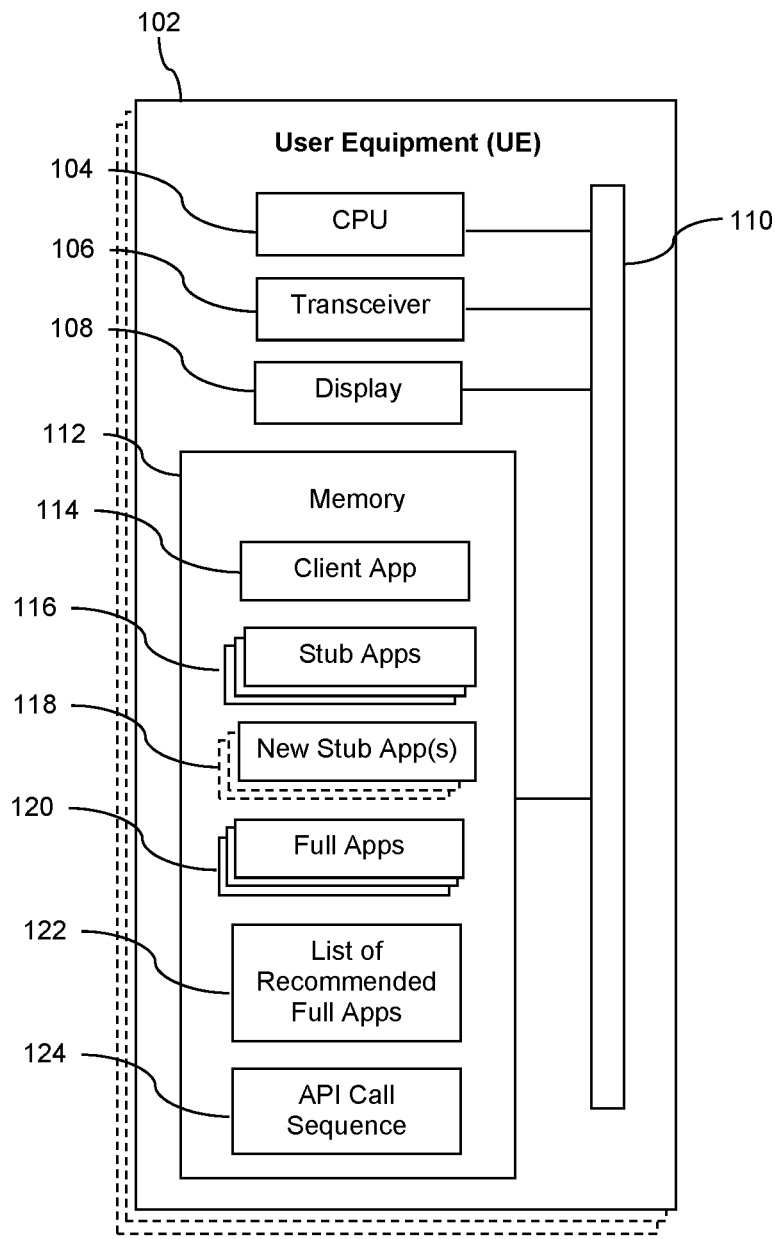
FIG. 2 is a block diagram illustrating an example user equipment that includes an example client application according to an embodiment of the disclosure.

In an embodiment, further features of the UE 102 depicted in system 100 are illustrated in the block diagram of UE 102 in FIG. 2. Thus, in referring to FIGS. 1 and 2, the UE 102, may comprise a communication bus 110 that communicatively couples processor (CPU) 104, transceiver 106, display 108, and memory 112. The UE 102 may be configured to communicate with network equipment (e.g., one or more eNodeB(s) 130, base station (BS), or other type of wireless wide area network (WWAN) access points) via transceiver 106 and one or more antennas. The UE 102 is configured to communicate with network equipment 130, and thus access network 150, using at least one wireless communication standard, such as 3GPP LTE, WiMAX, High Speed Packet Access (HSPA), Bluetooth®, Wi-Fi, or any combination thereof. Network 150 may comprise a public network, private network, wired network, wireless network, or any combination thereof and comply with the wireless standards discussed above. The display 108 may comprise a user interface, which in some embodiments may be configured to include a touch screen that provides data input from a user and visual output on the display.

The memory 112 is readable by CPU 104 via communication bus 110 and may be a non-transitory storage medium having non-volatile memory and/or storage elements. In an embodiment, the memory 112 comprises a client application 114, a plurality of stub applications 116, and a plurality of full applications 120. Full applications 120 may comprise fully functioning applications available from an online application market place, or a trial version of full application which may allow operation of the full application for a limited time or with limited features unless upgraded through a payment process. The amount of full applications 120 stored on the UE 102 may be limited by the size of available memory 112. The client application 114 may include a virtual installation widget and manages the installation of stub applications 116, along with interactions with network server 160 for retrieval of information from application repository 170.

In some embodiments, one or more stub applications 116 may be installed on the UE 102 via the client application 114. In general, a stub application (e.g., stub applications 116, 118) corresponds with one full application at any given time and is presented on the display 108 of UE 102 as if the stub application was a fully installed full application (or in some embodiments a trial version of the full application). As shown in FIG. 2, memory 112 may comprise stub applications 116 and new stub applications 118. The distinction between stub applications 116 and new stub applications 118 refers to the time at which the stub applications are received. In other words, at least some of the stub applications 116 are installed in memory 112 before the new stub applications 118.

As discussed in detail below, the new stub applications 118 may be installed after stub applications 116 once a list of recommended full applications 122 is received from an application repository 170 via the server 160. Such stub applications may be used, in an embodiment, to virtually pre-install full applications on the UE 102 by pre-installing limited functionality, updateable stub applications in place of installing the corresponding full applications. The limited functionality pertaining to the stub applications (e.g., 116, 118) does not refer to a trial or test version of the full application, but rather to a functionality that is directed primarily to the stub application presenting itself as if the full application was installed on the UE 102, thereby presenting what appears to be the full application on the display 108, but is actually a virtual representation by the stub application that uses a fractional share of memory 112 that the corresponding full application would occupy. The functionality of stub applications also includes being able to download and install the full application (with which it corresponds) in response to user selection (e.g., input via the user interface of display 108) with installation permissions for the full application already being satisfied. Note, the full applications 120 illustrated in FIG. 2 may comprise full applications that are pre-installed on the UE 102 prior to activation, and/or may comprise full applications that the user requests and are downloaded after activation with the wireless network. As used herein, the term activation refers to an initialization process in which the user's device (e.g., UE 102) is configured with identity and authentication tokens and a wireless communication provider's back-end (e.g., servers, a home location register, etc.) is provisioned to provide service to the UE 102, for example to associate a wireless communication service subscription account and/or phone number with a mobile equipment identity (MEID) or other unique hardware identifier to the UE 102. These initialization configurations may permit the UE to communicate over the wireless network. Other activation and/or initialization processes may comprise customizing the UE 102, for example providing service provider band information, installing power-on video, installing power-off video, and the like. This activation occurs at the start of the life of a new UE 102, for example when the UE 102 is first powered on.

As shown in FIG. 1, the full applications 120 resident (and thus actually installed on the memory 112) are presented by full application widgets 120*a-d* and in some embodiments the full applications 120 may be referred to as installed full applications. As discussed in detail below, stub applications (e.g., 116, 118) correspond only with full applications that are not yet installed on the UE 102 and/or were previously installed on the UE 102 but are not currently installed in the memory. This means that a stub application 116, 118 corresponds with a full application that is not presently installed (e.g., a recommended full application 175, a previously installed full application) in the memory 112 on the UE 102.

In some embodiments, each stub application 116 comprises a unique certificate, token, or other security verifier that comes pre-loaded in the stub application (or later received in some embodiments) and which satisfies installation permissions for a corresponding full application such that the stub application may be updated to the full application, thereby allowing installation of the full application on the UE 102. In an embodiment, the stub applications 116 may virtually represent a full application on display 108 by presenting an interactive thumbnail image in a widget (e.g., interactive thumbnail images within corresponding widgets 116*a-d*). The plurality of stub application 116 may be grouped together in frame 126 presented by the client application 114.

In some embodiments, frame 126 may not be visible to a user on the display 108. It is understood that the amount and arrangement of widgets 116*a-d* illustrated in FIG. 1 is exemplary and the widgets 116*a-d* may be interspersed between full application widgets 120*a-d* and thus may not be segregated or in isolation on the user interface. Each stub application (e.g., 116) uses a widget (e.g., illustrated as one of 116*a-d*) to show an interactive thumbnail image corresponding to a full application that is not currently installed on the UE 102. In some embodiments, widgets 116*a-d* may be referred to as user interface widgets that each comprise an interactive thumbnail image showing an image associated with a full application not installed on the UE 102.

The stub applications (e.g., 116, 118) configure the UE 102 to provide access to a data store (e.g., application repository 170) such that, in response to selecting the interactive thumbnail image via a widget, a full application corresponding to the stub application (represented by the interactive thumbnail image) may be downloaded and installed to replace or supplant the stub application. As discussed above, in some embodiments, the retrieval and installation of the full application may occur without asking the user to satisfy installation permissions prior to the installation. For more details on stub applications and virtual installation of full applications, see U.S. patent application Ser. No. 13/940,251, filed Jul. 11, 2013, entitled "Virtual pre-installation of Applications," by Fared A. Adib, et al., and U.S. patent application Ser. No. 13/940,253 filed Jul. 11, 2013, entitled "Dynamic Updating and Renaming Virtual Pre-Installation Stub Applications," by Fared A. Adib, et al., which are hereby incorporated by reference in their entirety.

Each stub application may comprise an interactive thumbnail image (e.g., presented in widgets 116a-d), a link associated with a full application, and installation permissions (e.g., embodied in a token, certificate, etc.) that correspond with a particular full application that is configured to execute on the UE 102. In some embodiments, each stub application 116 may initially be a generic stub application—in other words, an embodiment of a stub application which is not currently designated or corresponding to a full application but is capable of corresponding to (and thus is configurable to virtually representing itself as) a full application. In embodiments where generic stub applications are installed on the UE 102, the client application 114 may call server 160 to request information about a full application such that the generic stub application can virtually represent itself as (and thus correspond with) the full application indicated or recommended by the server 160.

For example, one or more generic stub applications may be installed on UE 102, but not yet correspond with a full application. The client application 114 may be notified as to which full application the generic stub application is going to virtually represent itself as, and then receive an interactive thumbnail image, link, and installation permissions corresponding to the full application. Once the client application 114 integrates this information into the generic stub application, that generic stub application would no longer be considered generic, and thus would correspond with a full application. Once a stub application (e.g., any of 116, 118) corresponds with a full application (e.g., after configuring a generic stub application or being installed on the UE with pre-loaded configurations), the stub application may then communicate and configure the processor 104 and display 108 via the communication bus 110 to present an interactive virtual thumbnail image (via a user interface widget) that corresponds to the full application, thereby presenting the stub application on the user interface as if it is a full application. As such, the stub application virtually represents the full application on the display 108 without actually having the full application (or trial version of the full application) installed in the memory 112 on the UE 102.

The installation of stub applications (e.g., 116 and 118) may conserve memory usage on UE 102 and decrease "app bloat"—that is, the presence of full applications on a UE that occupy memory despite being used infrequently, irregularly, and/or not being used at all. In some embodiments, each stub application occupies the same amount of space in the memory 112, irrespective of the full application with which each stub application corresponds. In another embodiment, each stub application 116 occupies a predefined amount of memory usage in memory 112 that is designated by the wireless service provider, and this memory usage is less than an amount that is (or would be) taken up by the full application or trial version thereof. For example, pre-installing ten full applications by the wireless service provider may use hundreds of megabytes of memory, whereas the use of ten stub applications that correspond with the same full applications would only use a fraction of the space (e.g., no more than one-quarter, one-tenth, or one-hundredth, etc the memory of a full application). It is understood that the exact amount of memory usage (and fractions thereof) discussed herein is exemplary and other predefined memory amounts are envisioned and may be determined or allocated by the particular wireless service provider via network server 160.

In some embodiments, the client application 114 can be provided to the UE 102 during manufacture, before activation with a wireless service provider's network is complete, and/or before the UE 102 is assigned to a customer (e.g., the UE being registered with a customer profile). Other embodiments may include the client application 114 being delivered to the UE 102 after activation with the network by the server 160. The client application 114 may be initiated upon each start-up of the UE 102, or in some embodiments may be initiated remotely by server 160. In an embodiment, the plurality of stub applications 116 may be preloaded on UE 102 (and other UE's associated with a wireless service provider) during manufacture or before activation of the UE 102 with the wireless service provider is completed. Alternatively, the client application 114 may make a request to server 160 for a plurality of stub applications 116 to be installed in memory 112.

In an embodiment, the client application 114 may initially receive and install a set of stub applications 116 that is not customized to the particular interests or preferences of the user corresponding to the UE 102. In some embodiments, this "non-customized" set of stub applications (i.e., the plurality of stub applications that correspond with full applications which have not been specifically selected based on preferences of the user) is received on the UE 102 shortly after (e.g., within one minute, ten minutes, one hour) the UE 102 is activated for use on the wireless network. This non-customized set of stub applications may comprise a random collection of mobile applications, an assortment of the most popular mobile applications, applications that are promoted through the wireless service provider from a third-party developer, or any combination therein. It is understood that alternate embodiments may include an at least partially customized set of stub application. For clarification, sets of stub applications (whether in a set customized based on preferences or not) do not comprise the full applications themselves, but rather comprise stub applications that correspond with information pertaining to the full applications (e.g., the interactive thumbnail image, link, installation permissions, etc.) as discussed herein.

In an embodiment, a user's UE 102 may be migrating from a previous wireless service provider to the instant wireless service provider that activates their UE 102 with a new provider's wireless network 150. The server 160 may obtain a previous account profile associated with the user and this may be obtained from the server of the previous wireless provider, media gateway, and/or analytics server (not shown). The previous account profile may comprise web interaction preferences, call logs, data logs, full application interaction history, pinsight interactions (e.g., related to mobile advertisements with which the user has interacted), or other mobile analytics can be used by server 160 to identify and assemble possible recommendations for full applications to install on the UE 102. In this embodiment, the set of stub applications that the client 114 requests and/or receives may correspond with at least some full applications that are based on recommendations using the previous account profile. For example, if the user account indicates that the UE 102 previously had a photography and banking full application installed prior to the migration, then two of the stub applications may correspond with these same photography and banking full applications, and thus virtually represent on the display as if these full application were pre-installed on the UE 102 despite actually being stub applications.

In some embodiments, the wireless service provider may not have access to a previous account profile associated with the user for whatever reason (e.g., possibly this is the first UE the user has owned, the information is not compatible with server 160 and thus migration didn't occur, the user requests no information be transferred, etc.). In some embodiments, the manufacturer of UE 102 and/or software developers may configure UE 102 to limit and protect personal information (and/or non-personal information) about the user pertaining to the UE's 102 operating system and/or full applications from a third-party. In some instances, client application 114 may be blocked from directly requesting personal and/or non-personal information from full applications installed on the UE 102 due to privacy settings (dictated by user interaction, the manufacturer, third-party developers, etc.) which are enforced by software and/or firmware on the UE 102. Thus, to determine which full applications may be preferred by the user without knowing much (if anything at all) about the user or their preferences (e.g., because of the lack of previous account profile, blocking direct requests, etc.), the client application 114 may be configured to non-obtrusively monitor certain local events (e.g., what full application are installed by the user after activation and the order of their installation) while also maintaining a designated amount of memory 112 usage through the use of stub applications 116.

Client application 114 may, in some embodiments, be referred to as a light client engine because client application 114 monitors only certain types of local events on the UE 102, thereby minimizing computational runtime of the processor(s) 104, allowing for less battery usage, and providing a quicker operating environment on the UE 102 which may improve the functioning of the device. In contrast, a "heavy" client would monitor all activities on the UE 102, thereby increasing the computational requirements of the UE 102.

Once the stub applications 116 are installed on the UE 102 for the first time, the client application 114 may be configured to begin monitoring some, but not all, local events on the UE 102. The client application 114 may, in some embodiments, not monitor every local event (e.g., every keystroke, every information exchange from full applications, etc.) on the UE 102, but instead may monitor those local events that pertain to requests from the network 150. By monitoring a more focused and customized delivery of stub applications 116 (or new stub applications 118) to the UE 102, where the stub applications will correspond to recommended full applications based on the monitoring. For example, the client application 114 may monitor communication bus 110 for messages made from the user interface via display 108 to the network 150 (e.g., via transceiver 106), where the messages are associated with requests to receive full applications from the network 150. This may entail a user wanting a social media application, and thus going to an application store to request download of that social media application (which is considered a full application, even if it is a trial version from the developer).

The client application 114 may monitor what full applications 120 are installed on the UE 102, the frequency with which each of the full applications 120 are used on the UE 102, and which of the full applications 120 are updated to a more current version. The client application 114 may also identify an order in which the full applications 120 are installed on the UE 102—that is, whether some full applications were installed before others. In some embodiments, the client application 114 may obtain at least some of the information being monitored by identifying requests for downloading full applications that are not yet installed on the UE 102 via the communication bus that are visible irrespective of privacy restrictions on the UE 102 (and thus even when the UE 102 operating system blocks direct access to the full applications). The client application 114 may also monitor the time (e.g., calendar date, hour, minute, etc.) of when a full application is installed on the UE 102 and/or time frequency between the original installation of a full application and subsequent requests for an updated version or a different full application. Where a user initiates a request to retrieve and install a full application without the use of a stub application, the client 114 may monitor the time with which the request was made, whether an update for a full application was requested, and whether the installation of the requested full application on the UE 102 was completed.

The client application 114 may also monitor and determine the types of full applications (e.g., via an application type identifier present in message from the application to the communication bus 110) that are installed on the UE 102. Based on the type of full applications (occasionally referred to a full application type identifier), the certain full applications not yet installed on the UE 102 may and/or may not be recommended for virtual installation one the UE 102 via the use of a new stub application 118. In some embodiments, the client application 114 may access an interaction log of the transceiver 106 to obtain at least some of the information about installed full applications to include with other monitored information that will be sent in a list request message.

In an embodiment, the client application 114 may initiate the monitoring once the UE 102 is activated for use on a wireless network of the wireless service provider. There may be multiple predefined time periods over which monitoring occurs. For example, a predefined time period since the monitoring was initiated may be ten minutes, one hour, twenty-four hours, five days, one week, one month, or any time periods in between. In an embodiment, each predefined time period may be designated by the server 160 during activation of the UE 102. The first time period over which monitoring occurs may be referred to as a first time phase. The client application 114 may create a list request message that comprises the monitored information over a predefined time period—such as after a first time phase, or any subsequent time phase thereafter. The list request message may comprise a request for a list of recommended full applications that are not installed on the UE 102 as of the time the list request message is being created.

The client application 114 may send the list request message to server application 166 that configures processor 162 of network server 160. In an embodiment, the list request message may be sent following the passage of a predefined time period since the monitoring was initiated on the UE 102 for the first time (i.e., after passage of the first time phase). In some embodiments, monitoring may continue after the first predefined time period (i.e., after passage of the first time phase), and thus during a second predefined time period (i.e. a second phase). In an embodiment, the second predefined time period (i.e., second phase) may comprise between one hour and twenty-four hours since the monitoring initiated for the first time on the UE 102. In some embodiments, monitoring may continue during a third predefined time period (i.e., a third time phase) such as any of three days, five days, one week, two weeks, one month, or multiples therein since the monitoring initiated on the UE 102 for the first time and/or since activation of the UE 102 with the wireless network. Monitoring over longer time periods may improve the server's 160 ability to refine the accuracy of recommended applications for the UE 102.

The server application 166 may be stored in non-transitory memory 164 on one or more network server(s) 160. The network server 160 may be communicatively coupled to a remote data store (e.g., full application repository 170) via network 150 or through a local connection. The application repository 170 may comprises identifiers of recommended full applications and/or at least some recommended full applications 175 stored in non-transitory memory. In some embodiments, the application repository 170 may comprise a plurality of data stores that correspond with a central access application server operated by a third-party that is separate from the operator of network server 160. For example, in an embodiment, application repository 170 may be accessed through an application storefront executing on a media gateway server (not shown). The network server 160 may use installation permissions (e.g., tokens, certificates, user authentication names and passwords, etc.) to access and retrieve a recommended full application 175 from application repository 170, which may then be passed along to UE 102 for installation on the UE 102.

After passage of a first predefined time period since the monitoring initiates for the first time on the UE 102 (e.g., after one hour since activation of the UE 102 with the wireless network), the server application 166 receives the list request message from the client application 114. The server application 166 configures processor(s) 162 to determine a list of recommended full applications that are ranked based on the monitored information received from the client application 114 on UE 102. The list of recommended full applications 122 may be determined by the server 160 executing server application 166 that implements a recommendation algorithm which, in some embodiments, comprises a market basket analysis and non-native matrix factorization (NMF).

In an embodiment, a market basket analysis determines how frequent characteristics in the monitored information occur so as to identify general trends in the information monitored and sent from the client application 114 on UE 102. For example, the server application 166 uses the information in the list request message to review which full applications are installed on the UE 102 at the time of activation with the wireless network, and which full applications the user downloads and installs on the UE 102 during the particular predefined time period (e.g., before the list request message is sent for the first time). This allows the server 160 to predict likely interests of the UE 102's user without reliance on a customer profile.

As mentioned above, non-native matrix factorization (NMF) may also be implemented into the recommendation algorithm. The incorporation of NMF configures server 160 to account for timing aspects related to information about the full applications 120 on the UE 102 by extracting latent features from the monitored information. Latent features may comprise application characteristics of one or more full application currently stored on the UE 102. For example, in some embodiments, the latent features extracted using NMF may describe how full applications 120 already installed on the UE 102 are related to the user's amplitude (level) of interest in a particular full application (or type of full application). This is used to create to a prediction as to what subsequent full application (not yet installed or virtually pre-installed on the UE 102) to recommend for use with in a stub application (e.g., a new stub application 118).

Application characteristics may include the memory size of an application (e.g., less than five megabytes (mb), between 5-50 mb, 50-100 mb, etc.), whether a full application pertains to a certain category (e.g., social media, banking and finance, photography, entertainment, etc.), how popular the full applications is based on the amount of downloads it receives on an application marketplace, whether it is considered a sponsored application associated with a business agreement that pays a premium to the wireless carrier for being featured in a stub application, or other information that is assigned a value by the network server 160.

In an embodiment, the list of recommended full applications is assembled without reliance on a user account profile and without usage data about the user of UE 102 prior to the start of any monitoring by the client application 114. This may be because the user is switching to a new wireless service associated with the network server 160, and thus server 160 does not have access or information pertaining to the user's previous account and usage data. In an embodiment, the usage data comprises information corresponding to at least one of application usage history, website visitation history, historical home screen configuration, internet purchases completed using a UE prior to the user's current UE 102, or any combination therein.

The server application 166 may assign a recommendation value to at least some, or in some embodiments all, recommended full applications 175 stored in application repository 170. The recommendation value may be based on the application characteristics of the full applications currently stored on the UE 102 and how closely they match to the trends identified by server 160. The list of recommended full applications 122 comprises a ranked set of recommended full applications that each have their own identifiers, where each recommended full application identifier receives a recommendation value based on the server applications 166 determined order. In the embodiment shown in FIGS. 1 and 2, the list of recommended full applications 122 includes a set of identifiers corresponding to full applications not yet installed on the UE 102 (i.e., recommended full applications), but which are recommended for the user of UE 102 and is ranked in ascending according to what the user is most likely to favor. In some embodiments, the list of recommended full applications 122 includes a minimum of recommendations represented by identifiers, such as five, ten, twenty, fifty, one hundred, or any number of identifiers in between.

As shown in FIGS. 1 and 2, the list of recommended full applications 122 is received by UE 102 and stored in memory 112. The client application 114 may propagate a subset of the highest ranked recommended full applications to the display 108 as virtually installed applications through the use of a new stub application(s) 118 (which are presented in one of the widgets 116a-d. In order to implement the list of recommended full applications 122, the client application 114 may designate a subset of the recommended full applications from the list as being of highest priority, and thus would use that subset of recommended full applications via new stub applications.

In an embodiment, the client application 114 reads the full list of recommended full applications 122, takes a subset corresponding to the highest ranking full applications, and generates an application programming interface (API) call sequence which designates the ranked order with which to call the subset. For example, if the client application 114 receives a list of fifty recommended full applications, then the client application 114 may pull the top eight recommended full applications from the list of fifty, and generate a sequence (ranked one through eight) from which new stub applications should be called first—where the new stub application corresponds to the highest ranked recommended full application within the subset. In an embodiment, the API call sequence 124 comprises a plurality of recommended full application identifiers that are in ranked order according to the priority given to the subset of recommended full applications taken from the list 122.

Before one of the recommended full applications from the list 122 is virtually represented on the display 108, the client application 114 will initiate an API call from the API call sequence 124. The client application 114 uses the API call to request a new stub application 118 from the network server 160, and the new stub application 118 will correspond to one of the recommended full applications identified in the API call sequence 124.

For example, the list of recommended full applications 122 may identify fifty recommended full applications, and the client application 114 may pull the top eight recommendations from the list 122 and place them in the API call sequence 124. The client application 114 can request a new stub application 118 that corresponds with highest recommended full application on the API call sequence 124 (i.e., the first out of the eight) by initiation of an API call that comprises the recommended full application identifier for the recommended full application being requested. The server application 166 may receive the API call and assemble information corresponding to the requested recommended full application to include in the new stub application—where the assembled information may include an interactive thumbnail image associated with the recommended full application; installation permissions such as security token, installation certificate, authentication credentials, and; a link to the recommended full application in application repository 170 for updating, downloading, and installation using the installation permissions).

Each new stub application corresponds to a recommended full application once the assembled information about the recommended full application is incorporated into the new stub application. It is understood that the server application 166 may assemble and create a plurality of new stub applications, where the amount created is based on the number of recommended full applications identified in the API call request from the UE 102. For example, if client application 114 initiates an API call 124 requesting the top three recommended full applications from its subset list (which was generated from the entire list of full recommended application), then the server application 166 would create three new stub applications with each one corresponding to one of the requested three recommended full applications.

Once server application 166 create the new stub application (e.g., 118) so that it corresponds with a recommended full application (i.e., those requested in the API call), the client application 114 receives the new stub application 118 and stores it in memory 112. In an embodiment, new stub application 118 supplants one of the plurality of stub applications 116 on the UE 102. This may include one of the plurality of stub application 116 being overwritten in memory 112 by the new stub application 118. This may have the advantage of preserving memory usage on the UE 102 compared to actually downloading the entire recommended full application to the UE 102. The new stub application 118 is virtually represented on the display 108 as the recommended full application to which it corresponds, but without having the entire functionality of the recommended full application (or trial version thereof).

For example, referring to FIGS. 1 and 2, three stub applications 116 may present widgets 116*a*, 116*b*, and 116*c* on display 108 with each having interactive thumbnail images corresponding to a full application not yet installed on the UE 102. The new stub application 118 may supplant an older stub application 116, and the new stub application 118 virtually represents itself as the recommended full application via widget 116*d* having an interactive thumbnail image corresponding to the recommended full application. Thus, from the user's perspective of display 108 in FIG. 1, it would appear as though eight full applications are installed on device UE 102 because eight widgets (each having an interactive thumbnail image) are presented on the user interface—however, the memory 112 and processor 104 resources being consumed would be less than that of eight full applications because four of the eight widgets being displayed (i.e., widgets 116*a-d*) are virtual representations of full applications and/or recommended full applications through the use of stub applications 116 and new stub application 118.

However, once a user selects (i.e., requests to launch) one of the stub applications 116 and/or new stub application 118 via an interactive thumbnail image (e.g., displayed as a widget 116*a-d*), the client application 114 initiates the link comprised in that stub application and sends the installation permissions to the server repository 170 (e.g., via network 150 and server 160), where the application repository 170 may interpret the incoming message as a request to update from a previous version of a full application identified in the stub application. The application repository 170, via the server 160, may use the received installation permissions (e.g., tokens, authentication certificates, etc.) to provide UE 102 with the corresponding full application represented by the stub application being launched. Stated simply, if new stub application 118 corresponds with recommended full application 175 (not yet stored on UE 102) and new stub application 118 is virtually represented as the recommended full application 175 via widget 116*d*, then once the interactive thumbnail image of widget 116*d* is selected (i.e. recommended full application 175 is requested to launch) the recommended full application 175 is retrieved from application repository 170 and installed in memory 112 without any other user interaction and without asking the user to input further information to obtain the recommended full application 175.

In an embodiment, the client application 114 monitors requests from user input, where the requests are to launch of the recommended full applications through the selection of a stub application via an interactive thumbnail image on the display 108. The client application 114 may not know the time and/or frequency with which these requests occur, as well as what recommended full application is being requested to launch. The client application 114 relays all requests to launch recommended full applications which are initiated via one of the plurality of stub applications 118 and may do so within the API call requesting a new stub application from the server 160, concurrent with the API call, or in separate communication(s) following predefine intervals.

The client application 114 may also periodically refresh the list of recommended full applications 122 in the memory 112. This refresh can occur ad hoc from the server 160 and/or in response to passage of a predefined time period since the monitoring on the UE 102 first initiates—such as after the first twenty-four hours, the first week, the first five weeks, or other such designated time periods. In some embodiments, the periodic refresh may be based on any of: requests for full application that are initiated by user input via the stub applications, installations of full applications that are initiated by the user independent from stub applications, updated determination of recommended full applications using monitored information pertaining to what full applications have been installed and updated since the last time the server 160 received information from the client application 114, or any combination therein.

In some implementations, one or more steps of the methods 300 and 700 discussed below may be executed by a processor configured to execute or control execution of the one or more steps of the methods 300 and 700. For example, one or more steps of the methods 300 and 700 may be executed by the processor(s) 104 or the processor(s) 162. In some implementations, the system 100 may include a special-purpose processor based computing device (e.g., at least UE 102 and server 160 of FIGS. 1 and 2, and UE 400 of FIG. 5) configured to perform one or more steps of the methods 300 and 700.

Figure 3:
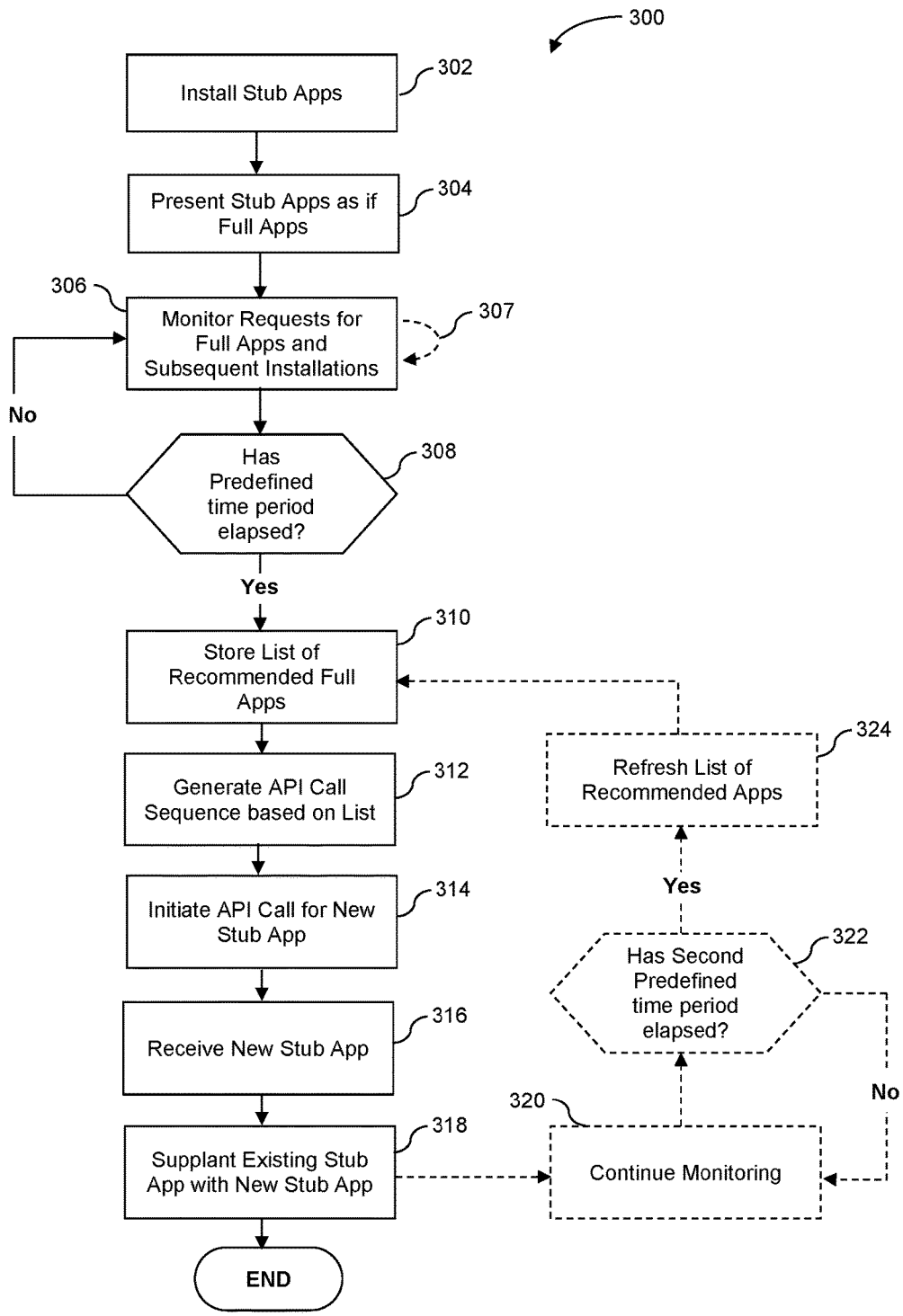
FIG. 3 is a flowchart of an example method for customized delivery according to an embodiment of the disclosure.
Figure 4:
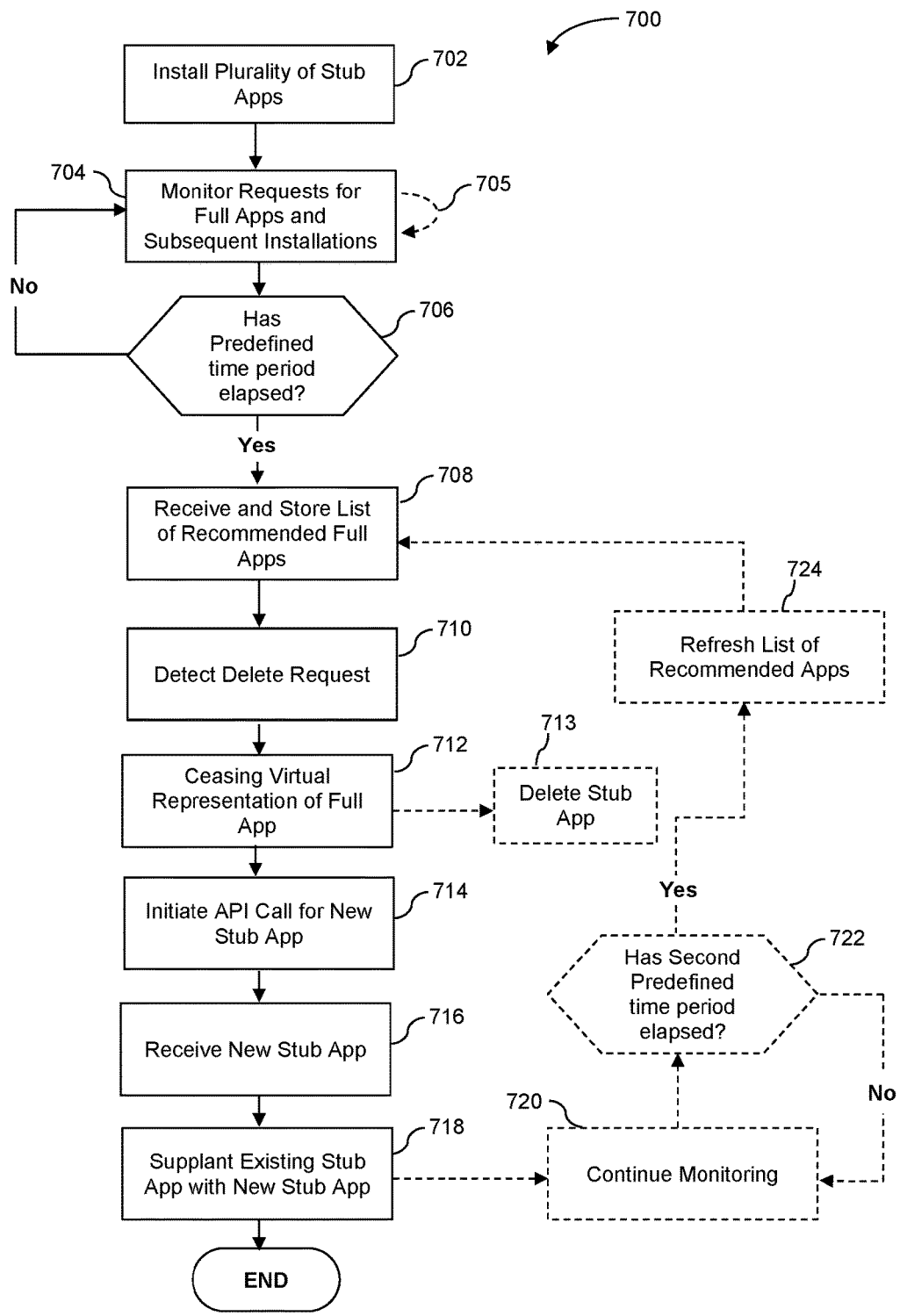
FIG. 4 is a flowchart of another example method for customized delivery according to an embodiment of the disclosure.

FIGS. 3 and 4 are flowcharts of an example method 300 and method 700, respectively, to provide customized delivery of specific applications (e.g., specific stub applications) to a UE. The method 300 may be implemented, in whole or in part, by the communication system 100 of FIGS. 1 and 2, or another suitable device or non-generic system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Referring now to FIG. 3, in some implementations the method 300 includes installing 302 a plurality of stub application on a UE (e.g., UE 102). The installing may be initiated via execution of a client (e.g., client application 114) on a processor of the UE that is stored in non-transitory memory. The plurality of stub applications may each comprise information corresponding to a full application that is not yet installed on the UE, but appears to be virtually installed from the user's perspective through the installation of the stub applications. Each of the plurality of stub applications may comprise an interactive thumbnail image corresponding to a full application not yet installed on the UE, a link to a memory address and/or universal resource identifier of a server for obtaining the full application not yet installed on the UE, and installation permissions for the UE (i.e., pre-authorized installation certifications for installing applications on the UE, as discussed in FIGS. 1 and 2 via keys, tokens, etc.) such that the user is not prompted to satisfy for installations on the UE. In some embodiments, the plurality of stub applications may not be based on a previous account profile corresponding to the user of the UE. In other embodiments, at least one of the stub applications corresponds with a full application that is being recommended for the user based on the client detecting a migration of a full application from the server (e.g., server 160) to the UE following activation of the UE on a wireless network of the wireless service provider.

Once the plurality of stub application are installed on the UE, the method 300 may also include presenting 304 the plurality of stub application on the user interface of the display as if each stub application is a full application. In some implementations, this may be accomplished by the client identifying an interactive thumbnail image of each stub application and presenting that interactive thumbnail in a widget on the display, thereby virtually representing each corresponding full application on the user interface via the stub application. This may improve the functioning of the corresponding UE because it reduces the memory usage through the use of the stub applications and reduces processing requirements for the UE by allowing processor resources to be directed to full applications that are actually installed on the device.

The method 300 may also include monitoring 306 requests for full applications that are initiated by user input via the user interface on the UE, and monitoring a time of subsequent installation of full applications where the installation is initiated by user input. In some embodiments, the client may monitor a communication bus and transceiver of the UE during monitoring activities. In some implementations, the client may be prevented by the operating system of the UE from requesting information directly from the full applications that are installed in memory of the UE, and in response to determining that restrictions are in place, the client may monitor the communication bus for installation activities initiated by the user. In some embodiments, the monitoring may occur continuously 307—that is, the client continues monitoring after information gathered about installation activities of full applications is sent to a server which recommends full applications implemented via stub applications on the UE. In an embodiment, the information being monitored may include requests, from user input, to launch one of the full applications being virtually represented through a stub application. The client may relay, to a server, the requests to launch full applications (e.g., those recommended by the server by not installed on the UE) which are initiated (i.e., requested to launch) through the use of a stub application.

The method 300 may also include determining 308 whether a predefined time period since the monitoring initiates for the first time on the UE has passed. If the predefined time period has not elapsed, then the client may continue monitoring. If the predefined time period has passed, the method 300 may continue. For example, if the monitoring occurs for twenty hours but the predefined time period for monitoring is twenty-four hours, then the client may continue monitoring until the twenty-four hour mark passes.

The client may send the monitored information to a server via a network after predefined time periods, such as after a first predefined time period, a second predefined time period, and a third pre-defined time period. The length of each predefined time period may be the same or different, and this time length may be designated by the client and/or remotely by the server. In an embodiment, the network server executes an application and assembles a list of recommended full applications for the UE to implement via stub applications, and the list is based on the monitored information. Once assembled, the client receives the list of recommended full applications from the server. In some embodiments, the list of recommended full applications is assembled by the server without reliance on a user account profile and/or usage data that existed in a communicatively coupled database prior to the start of monitoring by the client on the UE. Usage data may comprise information corresponding to any of application usage history on a UE, website visitation history, historical home screen configuration of widgets on a UE, internet purchases completed using a UE that the user previously owned, or any combination therein.

In response to passage of the predefined time period, the method 300 continues by the UE storing 310 a list of recommended full applications, where the list is assembled based on the monitoring. For example, the predefined time may be twenty-four hours after monitoring first began by the client. The list of recommended full applications pertains to the identification of full applications that are not currently installed on the UE, but are capable of being virtually installed on the UE through the use of stub applications. In an embodiment, the list of recommended full applications may include identifiers of full applications that are ranked in order according to the likelihood with which a user is most likely to request to launch the recommended full application via a stub application and install the recommended full application thereafter.

The method 300 may also include generating 312, by the client, an application programming interface (API) call sequence that designates a ranked order with which to call a subset of the recommended full applications from the list. For example, the list of recommended full applications may identify twenty recommended full applications for that particular user based on the monitored information. The client may take the top eight of the twenty recommended full applications from the list, and generate an API call sequence with those eight applications in ranked order so that when new stub applications are being requested by the client, these new stub applications will correspond with one of the eight according to the ranked order. As such, one or more API calls may be made, via the client, according to the API call sequence.

The method 300 may also include initiating 314, via the client, at least one API call from the API call sequence, where each API call includes a request for a new stub application corresponding to one of the recommended full applications identified according to the API call sequence. In an embodiment, the initiating may be triggered as soon as the API call sequence is generated. In some embodiments, the initiating is triggered based on a predefined routine of the client such that the client initiates one or more API calls for a new stub application every time a list of recommended full applications is received from the server.

The method 300 may also include receiving 316 the new stub application in response to the at least one API call. The new stub application received may include an interactive thumbnail image corresponding to a recommended full application that was requested in the API call, a link to a memory address and/or universal resource identifier of a server for obtaining the recommended full application, and installation permissions for the UE (i.e., pre-authorized installation certifications for installing applications on the UE, as discussed in FIGS. 1 and 2 via keys, tokens, etc.) such that the recommended full application corresponding to the new stub application is installed without prompting the user. In some implementations, the new stub application is the same memory size as a stub application already installed on the UE.

For example, in some embodiments, each stub application (whether associated with a particular full application not installed on the UE or not) may have the same memory footprint on the UE irrespective of which full application (or recommended full application) the particular stub application corresponds. This may allow for a more uniform and predictable resource usage so that the UE and server may allocate resources based on a known, predefined memory usage based on the number of stub applications currently residing on the device. In this manner, the stub applications may comprise a fractional share of a corresponding full application and may be uniform in memory size (i.e., the amount of memory space used) when installed on the UE.

The method 300 may also include supplanting 318 one of the plurality of stub applications already installed on the UE with the new stub application that was received. In some embodiments, a new stub application may identify which of the stub applications on the UE is to be supplanted with the new stub application. Supplanting an existing stub application with the new stub application may include overwriting the existing stub application in the memory of the UE with the new stub application, and replacing the interactive thumbnail image being presented on the UE with a new interactive thumbnail image corresponding to the recommended full application via the new stub application, thereby virtually installing the recommended full application on the UE without taking up the memory requirement that would otherwise be necessary to store the actual recommended full application. It is understood that the new stub application does not have all of the functionality of the recommended full application with which it corresponds, as explained above with respect to FIGS. 1 and 2.

In some embodiments of method 300, the client may continue monitoring 320 after a new stub application is received and installed on the UE. The monitoring may continue until a second predefined time period elapses, where the second predefined time period may be measured since when the monitoring of the client initiates for the first time on the UE. The client may determine 322 whether the second predefined time period has elapsed, and once it has, may request a refresh 324 of the list of recommended applications from the server. In some embodiments, the refresh of the list may occur aperiodically and/or ad hoc by the server.

As illustrated in FIG. 3, the method 300 may return to operation 310, and this time with the client receiving and storing a new list of recommended full applications. The new list of recommended full application may be assembled based on monitored information such as requests for full applications that are initiated via stub applications by user input, and installation of full applications that are not initiated via stub applications but rather acquired on the UE independent of stub applications. The server may determine to exclude certain full applications from the recommendation because they are already installed on the UE or to exclude applications in a category that is already well represented on the UE. For example, the server may determine that UE already has three full applications associated with banking (or another category type) installed on the UE, and because a typical user installs only two banking applications, the server determining the list of recommended full application may decide not to include another recommended full application of that type in the new list of recommended full application.

In an embodiment, the server may use the information received from the continued monitoring to review which full applications are installed on the UE since the last time information was reported via a list request and also determine which of the full applications installed on the UE have been updated by the user. The server may also determine when updates for those full applications became available for installation on the UE, and track how much time passed between the time the update became available and when the user actually initiated installation of that update.

For example, an installed full application which the user requests to update within thirty minutes of being notified of the update would be assigned a higher ranking value (to use in assembling and refreshing the new list of recommended full applications). In contrast, the user may have a different type of full application installed on the UE which is months behind in updates (i.e. an update for that installed full application is available via the network for download but the user has not commenced updating for that installed full application for months), thereby indicating that the type of full application may not be as relevant to the user, which correlates into the server assigning a lower ranking value relative to the other full applications installed on the UE which have been updated more frequently.

In an embodiment, if the user requests to launch a virtually installed recommended full application by selecting the corresponding interactive thumbnail image presented by one of the stub applications, this information may be included in the monitored information sent to the server. The server may determine whether the user installed one of the recommended full applications through one of the stub applications, and if they did, then the server may use that recommended full application for use with other stub applications on other UE's throughout the network. If the server determines that the user did not initiate any of the stub applications, and thus no recommended full applications were installed via the stub applications, then the server may retune the list of recommended full applications and refresh it according to the installation activities that were observed from the monitored information. In some embodiments, the operations 310 through 318 may be repeated based on periodic refreshing of the list of recommended applications, and this may occur after subsequent predefined time periods have elapsed.

FIG. 4 is a flowchart of an example method 700 for providing customized delivery of applications to a user equipment. The method 700 may be implemented, in whole or in part, by the UE 102 of FIGS. 1 and 2, or another suitable non-generic device or system. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

In some embodiments, the method 700 includes installing 702 a plurality of stub application in memory (e.g., non-transitory memory) of a UE. The installing may occur via execution of a client application on a processor of the UE from storage in non-transitory memory. The plurality of stub applications may be virtually represented on a user interface of the UE as if each stub application is a full application. This may occur in a manner substantially similar to that described in FIGS. 1, 2, and 3. The method 700 also includes monitoring 704, by the client via a communication bus, requests for full applications and monitoring the time of subsequent installation of full application that were initiated by user input via the user interface. In some embodiments, the monitoring 705 may occur continuously. A client executing on the UE may determine 706 whether a predefined time period has elapsed.

In response to passage of a predefined time period since the monitoring initiates for the first time on the UE, the method 700 continues and includes receiving and storing 708 a list of recommended full applications that is assembled based on the monitored information. The list of recommended full application may be assembled by a server that communicatively couples with the UE. In an embodiment, the client application on the UE compiles an API call sequence that designates a ranked order with which to call a subset of the recommended full application from the list received on the UE.

The method 700 may also include detecting 710, by the client via the user interface and/or communication bus, a delete request, where the delete request corresponds to a full application that is being virtually represented on the user interface by one of the plurality of stub applications. For example, the client application may use a stub application to present an interactive thumbnail image via a widget on the display, thereby virtually representing a full application to a user as if that full application was actually installed on the UE. The user may not be interested in that particular virtually installed full application via the stub application and thus seek to delete it from the UE by initiating a delete request.

In response to detecting the delete request, the method 700 may also include ceasing 712, by the client, the virtual representation of the full application by removing the corresponding stub application from the user interface. For example, the client application may remove the interactive thumbnail image within the widget from display on the user interface. In some embodiments, the delete request and subsequent ceasing of virtual representation of the full application is followed by deleting 713 the stub application from the memory of the UE. In an alternate embodiment, ceasing the virtual representation of the full application removes an interactive thumbnail image—which corresponds to the full application of the delete request—from the user interface but does not remove the corresponding stub application from the non-transitory memory of the UE. In this alternate embodiment, the stub application may obtain new information about another recommended full application and incorporate that information into the data structure of the existing stub application.

Referring back to the embodiment of FIG. 4, the client application may request a new stub application to replace the prior stub application that ceased virtual representation of its full application. The method 700 may include initiating 714, by the client, at least one API call that requests a new stub application associated with a recommended full application from the list. The API call request may be received by a server, which in turn may assemble the new stub application to include an interactive thumbnail image, link to retrieve the recommended full application from a repository, and installation permissions to satisfy installation on the UE without user involvement. The method 700 may continue with the client application on the UE receiving 716 the new stub application in response to the at least one API call.

The method 700 also includes supplanting 718, by the client on the user interface, the stub application corresponding to the delete request with the new stub application, where the new stub application virtually represents the recommended full application on the user interface without having all of the functionality of the recommended full application. In an embodiment, the new stub application has the same or less memory usage as the supplanted stub application which corresponded to the delete request and this amount of memory usage may be despite the new stub application being associated with the recommended full application which—if were to be installed without the use of stub application—would take a up a larger memory footprint.

In some implementations, the method 700 may continue monitoring 720 information about the full applications installed on the UE and information pertaining to interactions with stub applications. For example, in an embodiment, the client may relay, to a server, all requests to launch recommended full application that were initiated via one of the plurality of stub applications. The client application on the UE may, in some embodiments, determine 722 whether a second predefined time period has elapsed. For example, a first predefined time period may be one hour after the monitoring begins for the first time on the UE, and the second predefined time period may be twenty-hour hours after the monitoring begins for the first time on the UE. In some embodiments, the monitoring may continue after multiple predefined time periods (e.g., thirds, fourth, etc.). If the second predefined time period has elapsed. In some embodiments, the method 700 may continue with periodically refreshing 724, in the non-transitory memory of the UE, the list of recommended full applications.

This may be based on requests for full applications that are initiated by user input via the stub applications, and/or may be based on installations of full applications which are installed independent of stub applications. The periodic refresh of the list recommended applications may be implemented by returning to operation 708 that receives and stores a list of recommended applications from the server. The method 700 may then continue iteratively along operations 710 through 718.

Figure 5:
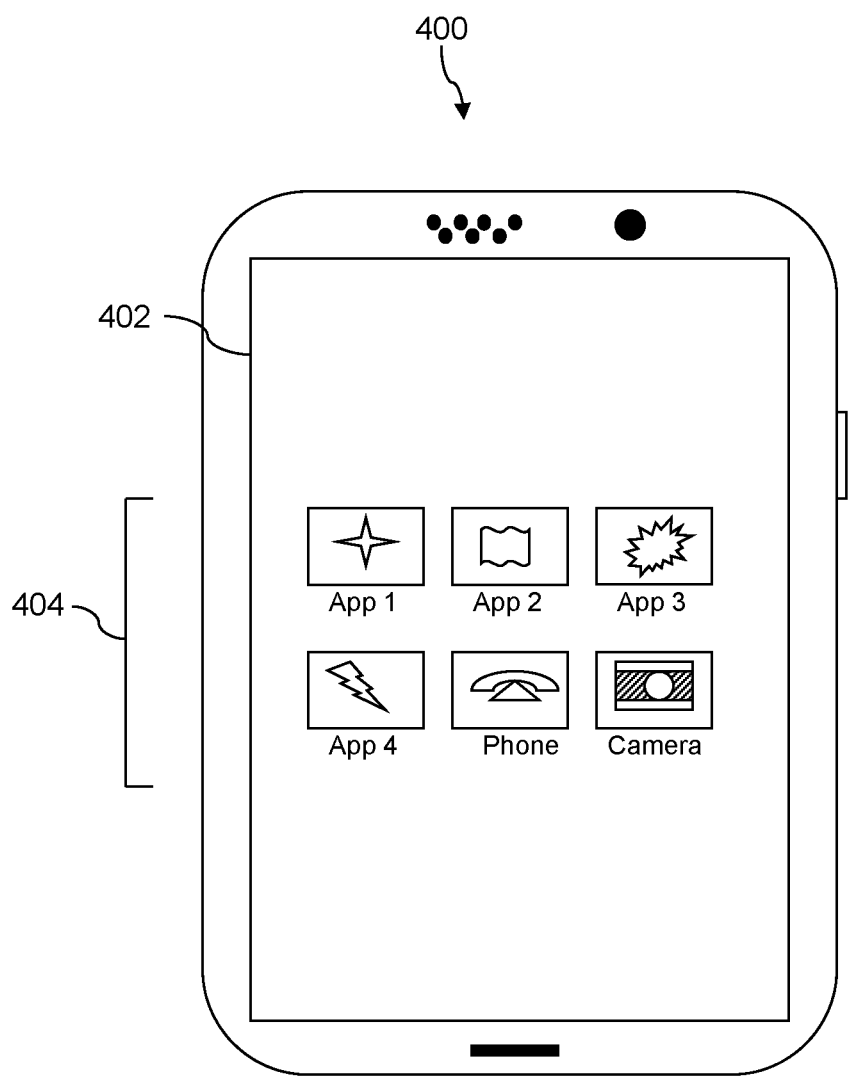
FIG. 5 is an illustration of a user equipment according to an embodiment of the disclosure.

FIG. 5 depicts the user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of or a specific embodiment of the UE 102 discussed above with reference to FIGS. 1 and 2. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed during the default installation procedure described above, for example applications 120 selected based on customization logic or rules as applied based on the individual profile, demographics, and/or history of a user associated with the UE 400. Some of the application icons 404 may be stub applications or thumbnail images associated with the full applications.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands.

These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
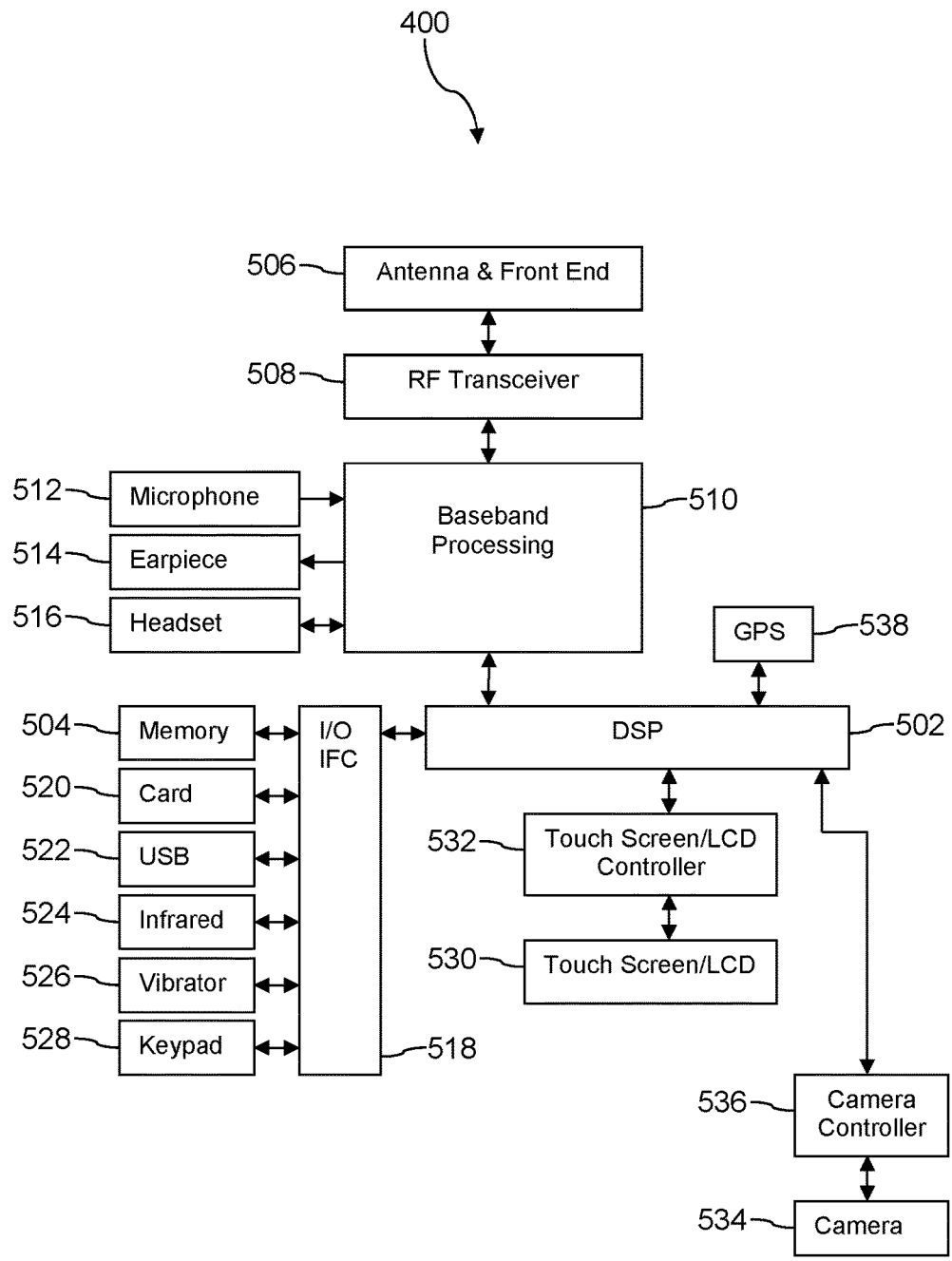
FIG. 6 is a block diagram of a hardware architecture of a user equipment according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
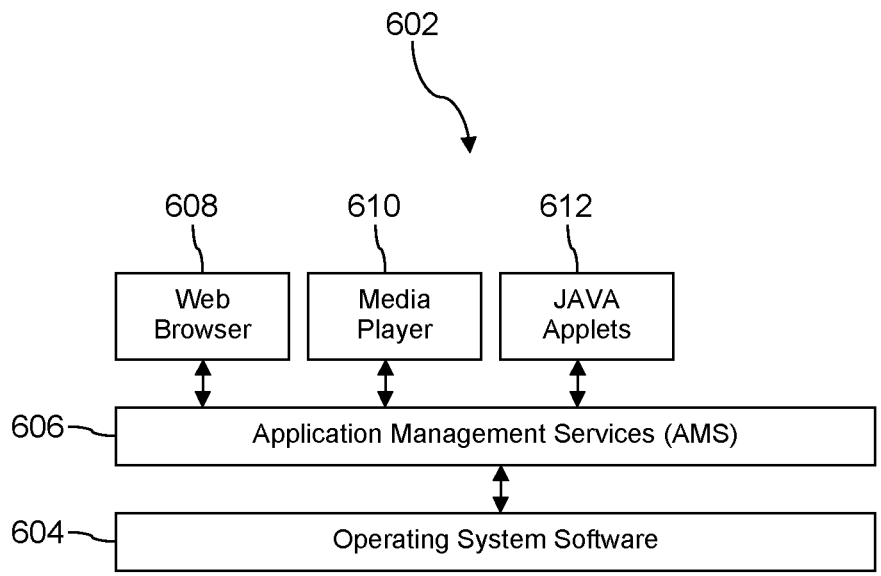
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
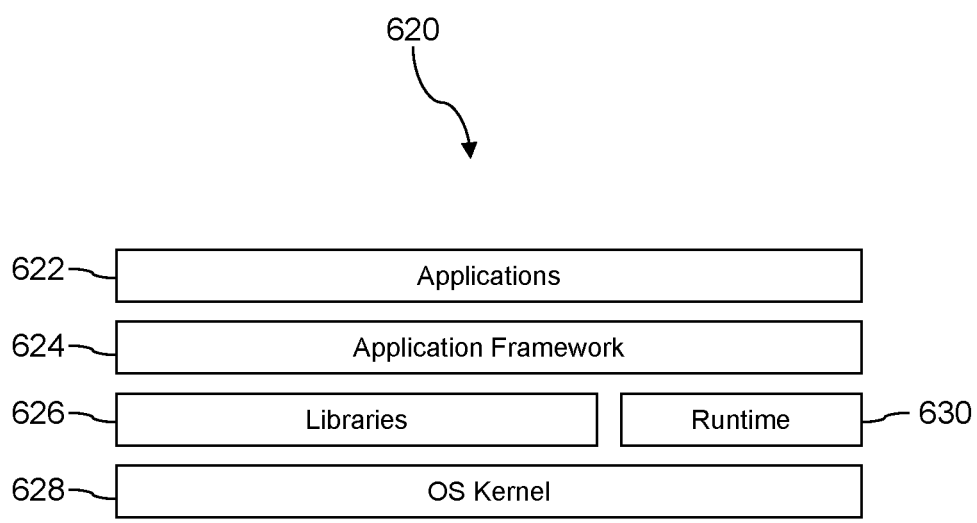
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
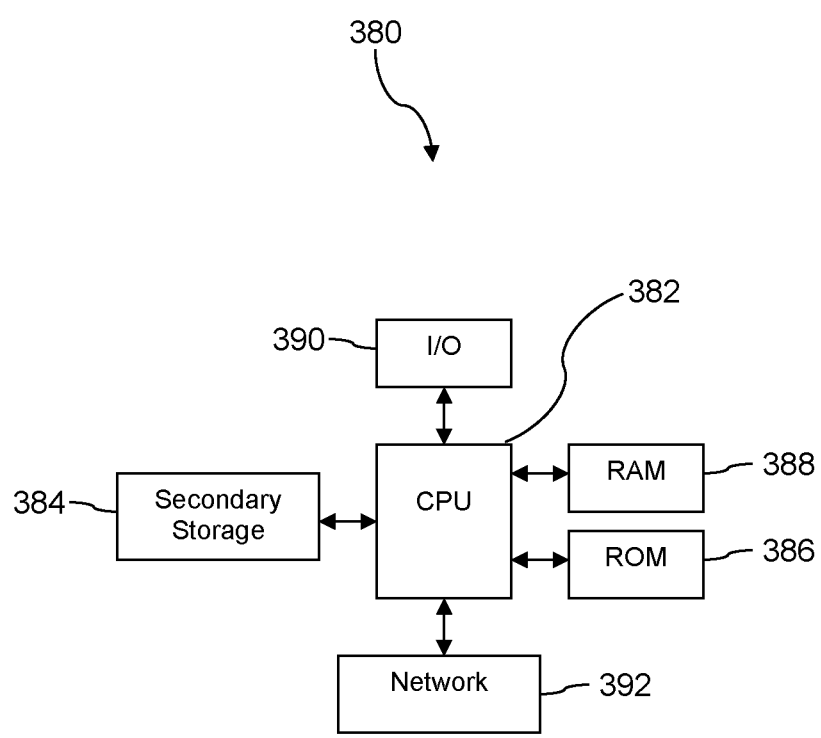
FIG. 8 illustrates an exemplary computer system suitable for implementing the several embodiments of the disclosure.

FIG. 8 illustrates a computer system 380 suitable for implementing one or more embodiments disclosed herein, such as elements of system 100 in FIGS. 1 and 2, including UE 102, server 160, application repository 170, and operations disclosed in FIGS. 3, and 4. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise on one or more non-transitory computer readable storage medium having computer usable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing customized delivery of applications to a user equipment (UE), the method comprising:
    installing, via execution of a client on a processor of the UE from storage in non-transitory memory, a plurality of stub applications on the UE;
    presenting, by the client via a display of the UE, the plurality of stub applications on a user interface as if each stub application is a full application;
    monitoring, by the client via a communication bus, requests for full applications and time of subsequent installation of full applications initiated by user input via the user interface;
    in response to passage of a predefined time period since the monitoring initiates for the first time on the UE:
        storing, in the non-transitory memory, a list of recommended full applications that is assembled based on the monitoring,
        generating, by the client, an application programming interface (API) call sequence that designates a ranked order with which to call a subset of the recommended full applications from the list,
        initiating, by the client, at least one API call from the API call sequence, wherein the at least one API call requests a new stub application corresponding to a recommended full application from the list,
        receiving the new stub application in response to the at least one API call, and
        supplanting, by the client, one of the plurality of stub applications with the new stub application, wherein the new stub application is virtually represented on the display as the recommended full application without having all functionality of the recommended full application.

2. The method of claim 1, wherein the predefined time period is less than twenty four hours since the monitoring initiates for the first time on the UE.

3. The method of claim 1, further comprising:
    monitoring, by the client, requests to launch one of the recommended full applications initiated from user input through the use of any stub application;
    relaying, by the client to a server, all requests to launch recommended full applications initiated via one of the plurality of stub applications; and
    periodically refreshing, in the non-transitory memory, the list of recommended full applications based on: requests for full applications that are initiated by user input via the stub applications, and installations of full application independent of stub applications.

4. The method of claim 3, wherein periodically refreshing the list of recommended full applications occurs in response to passage of a second predefined time period since the monitoring initiates for the first time on the UE.

5. The method of claim 1, wherein the list of recommended full applications is assembled by an application executing on a server based on the monitoring by the client on the UE, and wherein the client receives the list of recommended full application from the server.

6. The method of claim 1, wherein the list of recommended full application is assembled without reliance on a user account profile comprising usage data prior to the start of monitoring by the client.

7. The method of claim 6, wherein the usage data comprises information corresponding to at least one of: application usage history, website visitation history, historical home screen configuration, internet purchases completed using a previous UE, or any combination thereof.

8. A system for providing customized delivery of applications to a user equipment (UE), the system comprising:
    a UE comprising:
        a display comprising a user interface;
        a non-transitory memory storing a plurality of stub applications;
        a processor; and
        a client application stored in the non-transitory memory that, upon being executed by the processor, configures at least the processor to:
            present, via the display, the plurality of stub applications on the user interface as if each stub application is a full application,
            monitor requests for full applications and time of subsequent installation of full applications initiated by user input via the user interface,
            in response to passage of a predefined time period since the monitoring initiates for the first time on the UE:
                store a list of recommended full applications that is assembled based on the monitoring,
                generate an application programming interface (API) call sequence that designates a ranked order with which to call a subset of the recommended full applications from the list,
                initiate at least one API call from the API call sequence, wherein the at least one API call requests a new stub application corresponding to a recommended full application from the list according to the ranked order,
                receive the new stub application in response to the at least one API call, and
                supplant one of the plurality of stub applications with the new stub application, wherein the new stub application is virtually represented on the display as the recommended full application without having all functionality of the recommended full application.

9. The system of claim 8, wherein the predefined time period is less than twenty four hours since the monitoring initiates for the first time on the UE.

10. The system of claim 8, wherein the client further configures the processor to:
    monitor requests to launch one of the recommended full applications initiated from user input through any stub application,
    relay, from the UE to a server, all requests to launch recommended full applications initiated via one of the plurality of stub applications, and periodically refresh, in the non-transitory memory, the list of recommended full applications based on: requests for full applications that are initiated by user input via the stub applications, and installations of full applications obtained independent from use of stub applications.

11. The system of claim 10, wherein the periodic refresh of the list of recommended full applications occurs in response to passage of a second predefined time period since the monitoring initiates for the first time on the UE.

12. The system of claim 8, wherein the list of recommended full applications is assembled by an application on a server based on the monitoring by the client on the UE, and wherein the client receives the list of recommended full application from the server.

13. The system of claim 8, wherein the list of recommended full application is assembled without reliance on a user account profile and usage data prior to the start of monitoring by the client.

14. The system of claim 13, wherein the usage data comprises information corresponding to at least one of: application usage history, website visitation history, historical home screen configuration, internet purchases completed using a previous UE or any combination thereof.

15. A method of providing customized delivery of applications to a user equipment (UE), the method comprising:
 installing, via execution of a client on a processor of the UE from storage in non-transitory memory, a plurality of stub applications in non-transitory memory on the UE, wherein the plurality of stub applications are virtually represented on a user interface as if each stub application is a full application;
 monitoring, by the client via a communication bus, requests for full applications and time of subsequent installation of full applications initiated by user input via the user interface;
 in response to passage of a predefined time period since the monitoring initiates for the first time on the UE:
  receiving and storing, by the client, a list of recommended full applications that is assembled based on the monitoring;
 detecting, by the client via the user interface, a delete request corresponding to a full application that is being virtually represented on the user interface by one of the plurality of stub applications;
 in response to detecting, ceasing, by the client, the virtual representation of the full application by removing the corresponding stub application from the user interface;
 initiating, by the client, at least one application programming interface (API) call that requests a new stub application associated with a recommended full application from the list;
 receiving, by the client, the new stub application in response to the at least one API call; and
 supplanting, by the client on the user interface, the stub application corresponding to the delete request with the new stub application, wherein the new stub application virtually represents the recommended full application on the user interface without having all functionality of the recommended full application.

16. The method of claim 15, wherein the client compiles an API call sequence that designates a ranked order with which to call a subset of the recommended full applications from the list.

17. The method of claim 15, wherein the new stub application has the same memory usage as the supplanted stub application corresponding to the delete request despite the new stub application being associated with the recommended full application.

18. The method of claim 15, wherein ceasing the virtual representation of the full application removes an interactive thumbnail image corresponding to the full application from the user interface but does not remove the corresponding stub application from the non-transitory memory of the UE.

19. The method of claim 15, further comprising: relaying, by the client to a server, all requests to launch recommended full applications initiated via one of the plurality of stub applications that is virtually represented on the user interface.

20. The method of claim 19, further comprising: periodically refreshing, in the non-transitory memory, the list of recommended full applications based on: requests for full applications that are initiated by user input via the stub applications, and installations of full applications independent of stub applications.

\* \* \* \* \*